April 17, 1956
P. CART
2,742,546
DEVICES FOR DELAYING THE SWITCHING OF
AN ENERGY CONSUMING APPARATUS
Filed Nov. 24, 1952
2 Sheets-Sheet 1
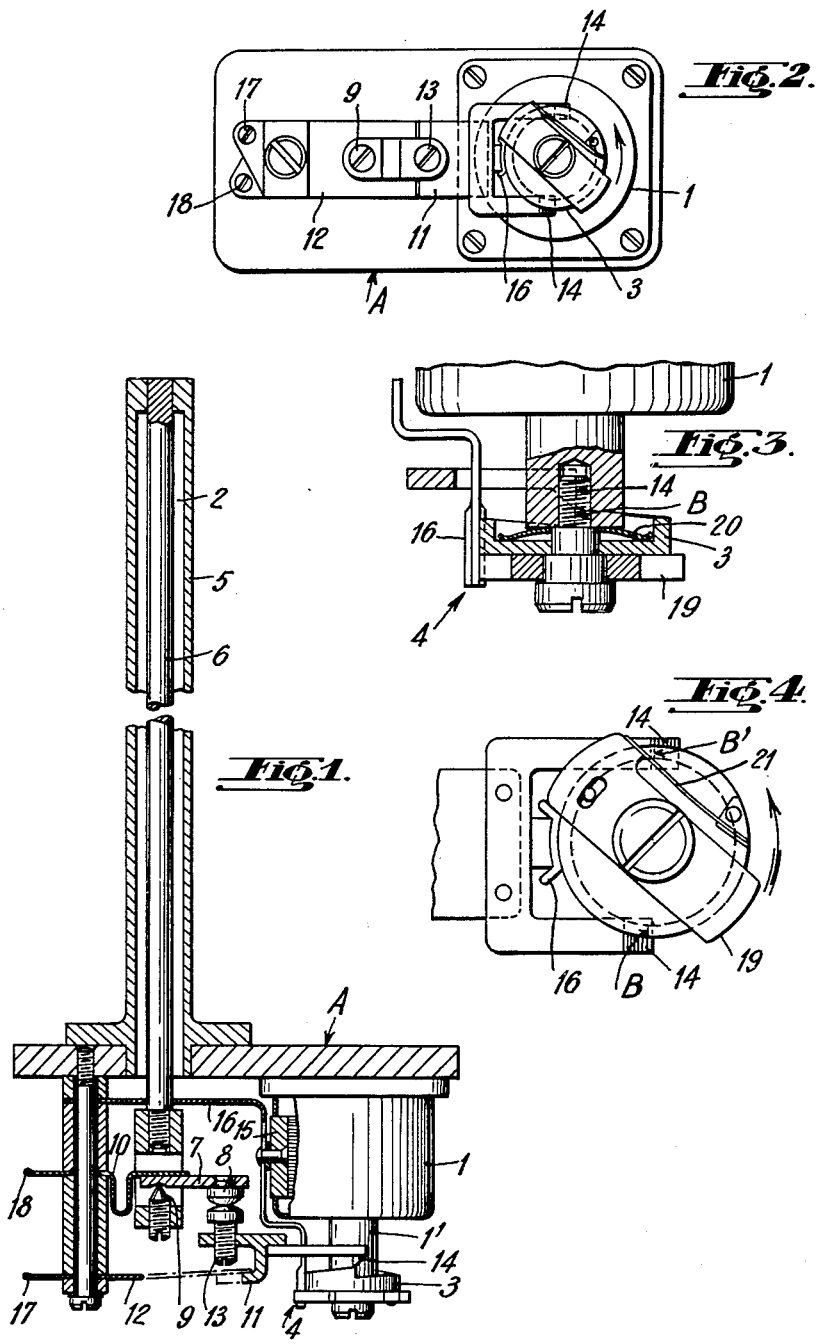
INVENTOR
PIERRE CART
ATTORNEYS

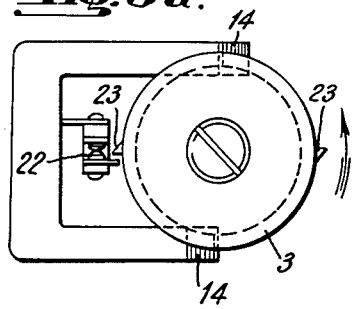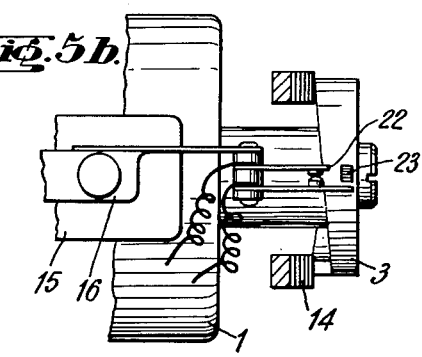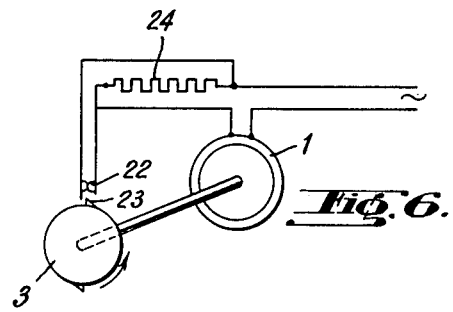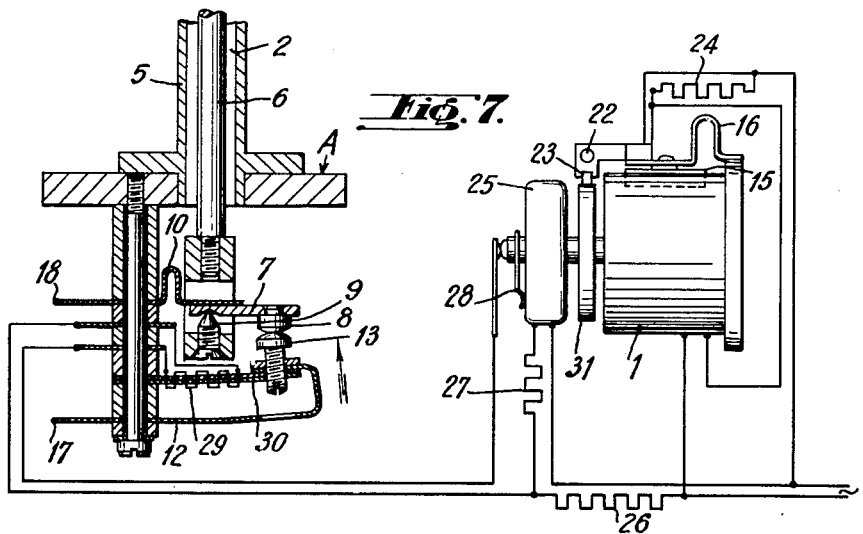

United States Patent Office 2,742,546
Patented Apr. 17, 1956

2,742,546

DEVICES FOR DELAYING THE SWITCHING OF AN ENERGY CONSUMING APPARATUS

Pierre Cart, Le Locle, Switzerland

Application November 24, 1952, Serial No. 322,310

Claims priority, application Switzerland January 23, 1952

9 Claims. (Cl. 200—136.3)

The present invention concerns a device for delaying the switching on of an energy consuming apparatus destined to receive energy during at least one charging period at disposal, the minimum total length of which is determined in advance, the quantity of energy to be absorbed depending on at least one physical quantity.

The load curve of electric distributing networks varies considerably in the course of the day. In particular the load always decreases fairly regularly during the night. This decrease in the load is due to the fact that the water heaters, for instance, are switched on at certain fixed times and then automatically switched off when their temperature has reached a limit value controlled by a thermostat. It is obvious that each apparatus must have at its disposal a charging period corresponding to at least one full heat charge. In effect, however, the heating up of the heater is only partial, this being due to the quantity of heat left in the heater at the end of the day, so that the heaters are successively switched off in the course of the night without the resulting diminution in the load being compensated by the switching on of other energy consuming apparatus. The purpose for which the water heaters are switched on during the night is thus but imperfectly attained.

The load curve may be made much more regular by individually retarding the switching on of energy consuming apparatus destined to receive energy during the period extending from the beginning to the end of the successive switching off of the apparatus switched on at a fixed time. It is essential, however, to furnish the necessary quantity of energy before the end of the period, and to ensure that the switching off time of the said apparatus is as near as possible to the end of the period at their disposal.

Apparatus for rendering the load curve of a distributing network more regular in the manner indicated, have already been proposed, but these apparatus are too sensitive to variations in the voltage of the network, and this results in a coarse control of the heating period. They moreover do not respond to a drawing off of heat during the heating period and are unable to compensate its effect. The present invention tends to remedy these defects and the device according to this invention comprises time measuring means, means sensitive to the said physical quantity, at least one connecting element cooperating with the said time measuring means and the said sensitive means, and correcting means destined to correct the inequalities between the time at disposal for the absorption of energy and the time measuring means.

The accompanying drawings show two examples of the device according to the invention as well as a variant.

Fig. 1 is a sectional elevation and Fig. 2 a view from below of the first example.

Fig. 3 is a sectional elevation of a detail of the device shown in Fig. 1 and Fig. 4 is a view from below of the same detail.

The device shown in Figs. 1 to 4, which is destined to control a water heater, comprises time measuring means constituted by a synchronous motor 1, means sensitive to temperature constituted by a thermostat indicated in a general way by 2, a connecting element between the motor 1 and the thermostat 2 formed by a cam 3, and correcting means 4 to be described hereafter.

The thermostat 2 comprises an outer tube 5, to the upper end of which is fastened a rod 6 extending inside the tube 5 and the coefficient of dilatation of which is different from that of the tube 5. This thermostat is arranged in such a manner that it measures as exactly as possible the quantity of heat contained in the water heater. A lever 7, one end of which carries a contact 8, is kept pressed against a point 9, carried by the lower end of the rod 6 but insulated from the same, by a spring strip 10 carried by the frame A of the device to which the tube 5 is fixed, this strip also being insulated from this frame. A second lever 11 is kept pressed against the cam 3 by a flexible strip 12 also carried by and insulated from the frame A. The lever 12 rests against the cam by means of two insulated studs 14 and carries a contact 13 situated opposite the contact 8. The exterior connections of the thermostat are shown in 17 and 18.

The correcting means 4 comprise a magnetic plate 15 which is attracted by the magnetic field of the stator of the synchronous motor 1. A spring strip 16 acts in opposition to the said magnetic field.

Figs. 3 and 4 show the detail of the cam 3 and of part of the correcting means. The cam is circular and has an active face extending over an angle of 180° and ending abruptly in B and B'. The cam is driven by the synchronous motor 1 through a friction clutch 20 and accomplishes one half of a complete revolution in a time slightly less than the period. 19 indicates a plate also frictionally driven with the cam 3 and the purpose of which will be described later on.

The device described operates as follows:

The motor 1 is switched on at the beginning of the period at disposal for heating up the water in the heater which as usual is accomplished by a time switch controlling current from the power station. If this period is divided up into several parts, the motor will be switched on and off for each partial period. The shaft 1' of the motor carrying the cam 3 causes the latter to rotate so that the contact 13 carried by the lever 11 gradually approaches the contact 8. The more the rod 6 protrudes from the tube 5, that is, the less hot water there is in the heater and consequently the less the tube 5 is dilated, the quicker the contact 13 touches the contact 8. As soon as the heater is heated to a temperature exceeding that which is determined by the cam 3 at the instant considered, the contacts 8 and 13 are again separated by the dilatation of the tube 5 of the thermostat 2. The contacts will touch again as soon as the contact 13 has moved sufficiently under the influence of the cam 3, and so on, until the requested temperature has been attained in the heater.

The magnetic plate 15 is attracted by the magnetic field of the synchronous motor 1 and presses the end of the spring strip 16 against the cam 3. The plate 19 is stopped by the inclined plane of the spring strip 16 shortly before the end of the period, the friction clutch 20 permitting, while the cam 3 continues to revolve to the extent permitted by a pin and slot lost motion connection between the same and the plate 19 being then stopped. When the current flowing through the synchronous motor 1 is cut off, the spring strip 16 is released and withdraws to enable the plate 19 to move for a certain angle under the influence of the spring 21 back to normal position relative to the cam 3 avoiding necessity of readjustment. When the motor is switched on again, the spring strip rests against the end of the plate and thus the cam is not prevented from rotating.

The position of the cam in relation to the plate 19 and to the studs 14 is adjusted in such a manner that at the beginning of each period, as well as at the extreme end of the period, the studs rest in the hollow of the cam, so that when the current is switched on, the contacts 8 and 13 are not touching, unless all the hot water contained in the heater has been drawn off.

Figs. 5a, 5b and 6 show a variant of the first example.

In this variant, the magneto-mechanical correcting means are replaced by the magneto-electrical means described below:

The end of the spring strip 16 (see Fig. 1 also) carries an electric contact 22 which opens, under the influence of two projecting teeth 23 carried by the cam 3, an instant after the stud 14 has dropped back in the hollow of the cam 3. When the magnetic plate 15 is released, the strip carrying one of the contacts 22 escapes and the contact is established again. The tooth 23 being pointed, the strip slides along the back edge of the tooth when the plate 15 is attracted anew, and the contact 22 remains closed.

The device operates as follows (see Fig. 6, showing the electrical circuit): When the contact 22 is opened, a resistance 24 is connected in series with the synchronous motor 1, the value of the resistance being such that the motor stops, the magnetic plate 15 being however still held in position. The cam 3 is thus maintained in its position, although a voltage is still applied to the connecting leads of the device. At the end of the charging period, the plate 15 is released, thus causing the contacts to close, but the synchronous motor is not started again. The latter will only begin to run again at the beginning of a new charging period. It may be noted that with this variant the period may also be divided up into partial periods, as the tooth 23 only acts at the end of the total period.

Fig. 7 shows a second example which only has a few parts in common with the first. These have been indicated by the same numbers and will not be described. Instead of acting directly on the contact 13 by means of the cam 3, the synchronous motor 1, which in this case accomplishes one whole revolution per period, acts through electrical means described below:

A potentiometer 25 receives a current which is kept constant by means of an iron-hydrogen resistor 26 and a fixed resistance 27. A variable voltage is tapped off at the contact arm 28 of the potentiometer and the resistance 27 is applied to a resistance 29 which heats a bimetal strip 30 so as to bend it in the direction shown by the arrow. This bimetal strip carries the adjustable contact 13 and brings it closer to the contact 8, as in the first example. The current flows through the strip 12 in order to avoid influencing the functioning of the bimetal strip 30.

The mechanical and electrical characteristics of the potentiometer, of its auxiliary resistances and of the bimetal strip are chosen so as to impart to the contact 13 the same movements as in the first example. Mechanical or electrical means for correcting the period are provided on the synchronous motor. The means shown is the electrical device comprising a disk 31 with a projecting tooth 23 and the other elements previously described. In this example the synchronous motor 1 and the larger part of the elements of the device can be mounted apart from the water heater and need only be connected to the latter by the leads shown in Fig. 7.

A lightly loaded asynchronous motor, a clockwork mechanism or a condenser charged by means of a constant current might be used instead of the synchronous motor to measure the time.

The means sensitive to the physical quantity governing the function which is to be obtained might be constituted by a piezostat, a hygrostat, a thermo-electric couple or a variable electric resistance.

A lever, a bimetal strip, a differential gear mechanism, an electronic device, a valve or a flexible membrane might also be used instead of the cam of the devices described.

Certain elements of the correcting means might also be replaced by an auxiliary electro-magnet, by an escapement with a return spring or by a differential gear mechanism for instance.

Although the device has been described as applied to a water heater, other applications may be considered such as, for instance, the heating of rooms at a moment determined by their initial temperature, or the automatic preparation of an industrial process destined to be started at a predetermined moment. The device is also suitable for controlling the functioning of kitchen ranges fitted with heat accumulation.

What I claim is:

1. A device for delaying the switching on of an energy consuming device to which electric energy has to be supplied during a given period of time which may be divided into sub-periods and whose total duration is greater than that required by the energy consuming device, the quantity of energy to be absorbed depending on at least one physical condition of the consuming device, the said device comprising time measuring means, means sensitive to the said physical quantity, at least one connecting element between the said time measuring means and zeroising means destined to correct the inequalities between the said given period and the time measured by the said time measuring means.

2. A device as claimed in claim 1 and comprising at least one electrical contact, for ensuring the switching on of the energy consuming apparatus, and mechanically assembled with the means sensitive to the said physical quantity and with at least one connecting element.

3. A device as claimed in claim 1 and comprising at least one electrical contact, for ensuring the switching on of the energy consuming apparatus, and mechanically assembled with the means sensitive to the said physical quantity, with the time measuring means, with at least one connecting element and with the said zeroising means.

4. A device as claimed in claim 1, in which the said time measuring means includes a motor and the said zeroising means, for correcting the inequalities between the time at disposal and the period proper of the device, comprises a magnetic plate attracted by the magnetic field of the motor and blocking a connecting element towards the end of the said period, and an oscillating spring actuated plate which prevents the blocking action from taking place at the beginning of the following period.

5. A device as claimed in claim 1, in which the said correcting means comprises an auxiliary electro-magnet.

6. A device as claimed in claim 1, in which the said zeroising means comprises at least one auxiliary contact.

7. A device as claimed in claim 1, in which the said zeroising means comprises an escapement with a return spring.

8. A device as claimed in claim 1, in which the time measuring means is a synchronous motor and the means sensitive to the physical quantity a thermostat, and comprising connecting elements formed by a continuously variable potentiometer, a resistance through which flows the current controlled by the potentiometer, and a bimetallic strip, and zeroising means formed by a mobile magnetic plate carrying an electrical contact which opens under the influence of a disk fitted with at least one projection at its periphery and mounted on the shaft of the motor.

9. A device as claimed in claim 1, in which the time measuring means is a synchronous motor and the means sensitive to the physical quantity a thermostat, and comprising connecting elements formed by at least one cam with a continuous active face and placed at the end of the shaft of the synchronous motor, and a spring strip resting on the cam by means of two projecting studs, and zeroising means formed by a magnetic plate cooperating with an oscillating spring actuated plate and with a friction member which slips when the cam is stopped by the magnetic plate acting on the oscillating plate, the synchronous motor running on until the end of the period at disposal.

References Cited in the file of this patent

UNITED STATES PATENTS

| | | |
|---|---|---|
| 2,266,252 | Osterheld | Dec. 16, 1941 |
| 2,266,256 | Osterheld | Dec. 16, 1941 |
| 2,367,370 | Osterheld | Jan. 16, 1945 |
| 2,368,773 | Osterheld | Feb. 6, 1945 |
| 2,376,664 | Crise | May 22, 1945 |
| 2,387,177 | Osterheld | Oct. 16, 1945 |
| 2,461,903 | Kurtz | Feb. 15, 1949 |
| 2,488,572 | Varney | Nov. 22, 1949 |